Feb. 7, 1961  H. A. ROHDIN  2,970,414
METHOD AND APPARATUS FOR BLISTER PACKAGING
Filed Dec. 18, 1958  7 Sheets-Sheet 1
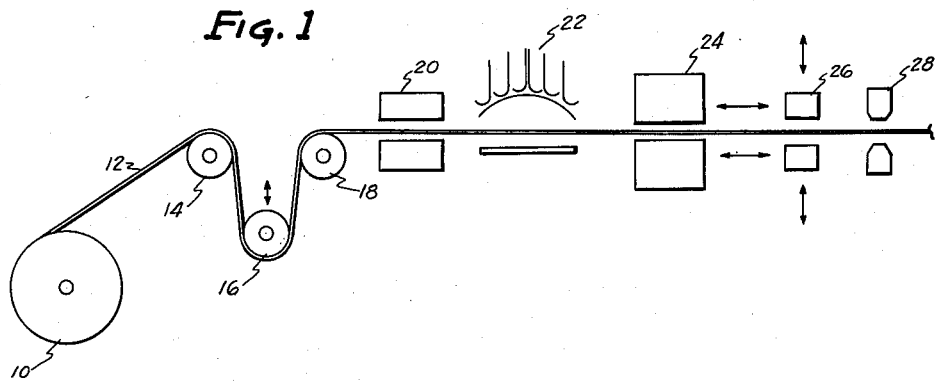
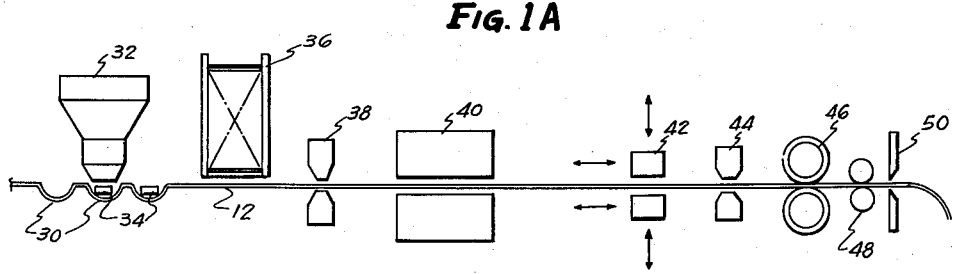
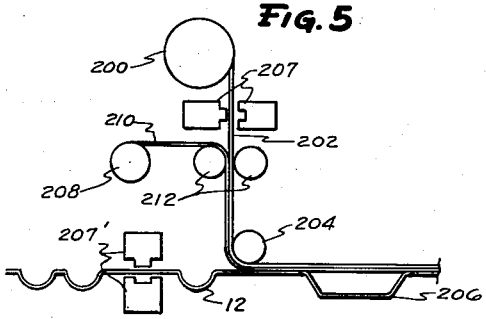
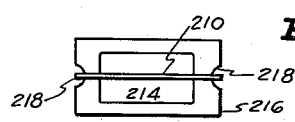
INVENTOR.
Howard A. Rohdin
BY

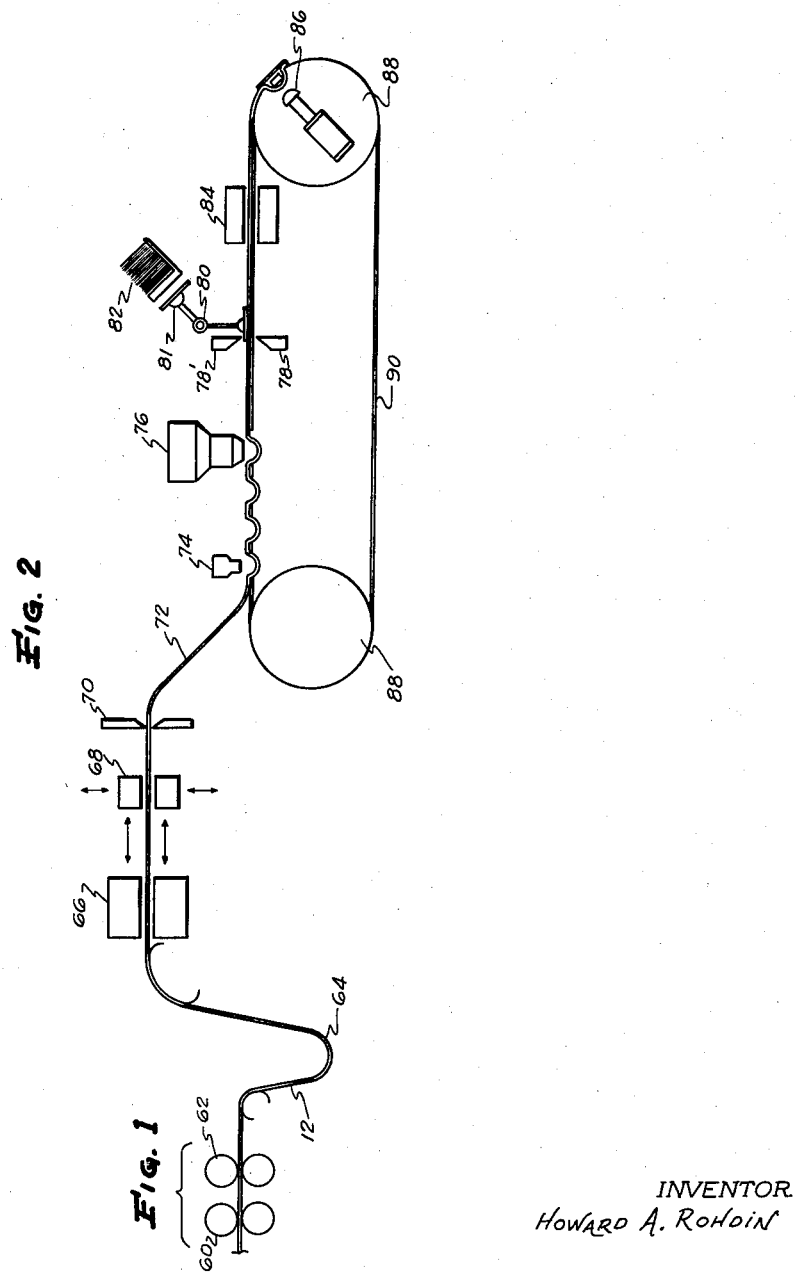

Feb. 7, 1961  H. A. ROHDIN  2,970,414
METHOD AND APPARATUS FOR BLISTER PACKAGING
Filed Dec. 18, 1958  7 Sheets-Sheet 3

INVENTOR.
HOWARD A. ROHDIN
BY

Feb. 7, 1961 H. A. ROHDIN 2,970,414
METHOD AND APPARATUS FOR BLISTER PACKAGING
Filed Dec. 18, 1958 7 Sheets-Sheet 4

INVENTOR.
HOWARD A. ROHDIN
BY

Feb. 7, 1961 H. A. ROHDIN 2,970,414
METHOD AND APPARATUS FOR BLISTER PACKAGING
Filed Dec. 18, 1958 7 Sheets-Sheet 5

INVENTOR.
Howard A. Rohdin
BY

United States Patent Office 2,970,414
Patented Feb. 7, 1961

2,970,414
METHOD AND APPARATUS FOR BLISTER PACKAGING

Howard A. Rohdin, 397 Forest Ave., Glen Ridge, N.J.

Filed Dec. 18, 1958, Ser. No. 781,395

18 Claims. (Cl. 53—29)

It is an object of this invention to provide a method and machine for forming, filling and sealing packages of the "blister" type.

It is a further object of this invention to provide a machine as aforesaid made up of two separate units which may be operated independently or both at once with full synchronization.

It is a further object of this invention to provide a machine capable of filling and sealing previously formed blisters.

It is a further object of this invention to provide a machine as aforesaid in which most operations are fluid pressure actuated and in which, within each cycle not only the initiation but also the duration of each action is independently adjustable.

It is a further object of this invention to provide a machine as aforesaid which is capable of forming blisters at one center to center spacing and of filling and sealing such blisters on a different center to center spacing.

It is a further object of this invention to provide a machine as aforesaid capable of filling and sealing simultaneously a plurality of blisters of mutually different shapes and sizes.

It is a further object of this invention to provide a machine as aforesaid in which by instantaneous adjustment either or both of several different types of packages can be produced.

The above and other objects will be made clear from the following detailed description taken in connection with the annexed drawings in which:

Figure 1 is a schematic elevation of the lead end of the improved machine;

Figure 1A is a continuation of Figure 1 showing the remaining stations of the machine;

Figure 2 is a view similar to Figure 1A but showing an alternative arrangement of stations;

Figure 5 is a schematic view of an alternative lid applying arrangement;

Figure 5A is a plan view of the package produced by the arrangement of Figure 5;

Figure 3:
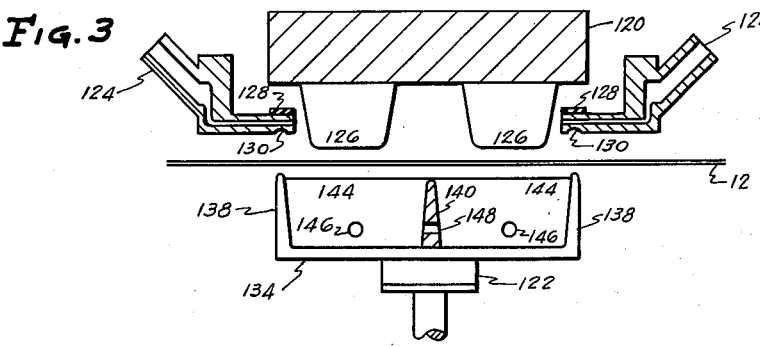
Figure 3 is a partial section of the blister forming unit.
Figure 3A:
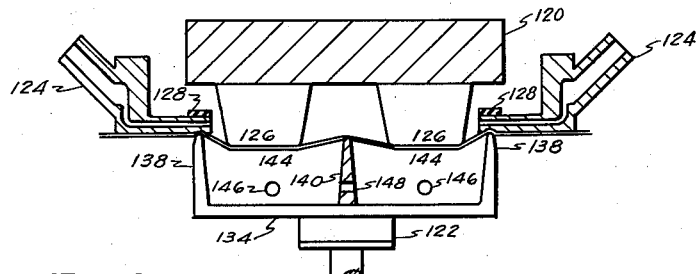
Figure 3A is a similar one to Figure 3 and illustrates the initial forming step.

Blister type packaging is becoming of increasing importance. It affords visibility of contents, and by proper design can be made to give any desired degree of protection both hermetic and mechanical. The most usual form of this package is a thermoformed blister surrounded by an integral flange, the flange being heat-sealed to a properly coated sheet of paperboard, or coated, or uncoated compatible plastic and the contents being stowed within the blister. The fundamentals of this art are well discussed in Modern Packaging Encyclopaedia of 1958, beginning at page 434. Despite the popularity of this type of package and the immense volume offered by items suitable for such packaging, relatively little has been done in the automation of the packaging process. Moreover, such progress as has been made suffers from high cost and extreme inflexibility of the equipment and there has not heretofore been produced a machine capable of unit production rates at all comparable with what has been attained in hitherto conventional packaging.

The present invention provides the requisite unit rate (e.g.: 200 to 350 per minute) but combines this high rate with wide adjustability to make the benefits of the machine available to users of a wide variety of products each of which individually would not be sufficiently volumetric to warrant a purely specialized machine. The fundamental concept of the machine is quite radical. A cam shaft actuates a series of switches, these, in turn actuate adjustable timers which in turn actuate valves for fluid pressure pistons which perform the various operations as close as possible to the point of actual operation. The cams, being themselves circumferentially adjustable contribute a degree of flexibility, and the timers being manually and instantly adjustable contribute a far greater degree of flexibility. As used herein the terms "pneumatic," "hydraulic" and "fluid pressure" each shall be taken to include all, unless particularly specified.

There are other advantages. By using a cam on one shaft to trigger a second or third cam shaft, two or more units can be synchronized even though the cycles of the several units are mutually quite different. The only essential is that the several units perform the same number of cycles per unit of time.

Referring now to Figures 1 and 1A, there is shown a roll 10 from which is fed a web 12 of plastic material. The web 12 passes over a guide roll 14, a dancing roll 16 and another guide roll 18. Thence it passes between clamping blocks 20, then under a radiant heating element 22 to a blister forming station 24. Thereafter it passes between feed clamps 26 and fixed clamps 28. Thereafter the web 12, in which blisters 30 have been formed, passes beneath a feeding element 32 which deposits contents 34 in the blisters 30. The filled blisters now pass beneath a card feeding station 36 which deposits cards lying across each row of blisters 30. Immediately thereafter, the card-topped blisters pass between the jaws of a heated clamp 38 which makes spot heat seals, between the blisters and the cards. The web, with the cards, then pass between heat-sealing dies 40 which effect a seal between the card and all of the blisters, the seal extending around the periphery of each blister in a row. The web is then further advanced by feed clamps 42 which are similar to and synchronized with the feed clamps 26. Holding clamps 44 cooperate with the feed clamps 42. The web and cards then pass through a scoring machine 46 to frictional tension rolls 48 and thence to a cutoff 50.

It will be realized that an endless variety of mechanisms could be provided to actuate and synchronize the instrumentalities above described and in detail, these largely would be conventional. For this reason no detail showing will be made here. Preferred mechanisms will be suggested. It also will be understood that, if desired, the web movement may be continuous, in which case the various stations will move with the web in the manner of the well known "flying shears."

The dancing roll 16 is reciprocated vertically, by a cam and lever, or by a fluid pressure piston and cylinder and makes its downward stroke at a time when clamps 20 and 28 are closed, thus the downstroke of the roll 16 draws a predetermined length of the web 12 from the roll 10. While the clamps 20 and 28 are engaged, the feed clamps 26 are disengaged and moved backward toward the sealing station 24. In their rearward position the clamps 26 engage and grip the web as the clamps 20 and 28 are released and the roll 16 moves upward. The clamps 26, while engaged, move forward advancing the web 12 and taking up the slack previously created by the roll 16. During the period of engagement of the clamps 20 and 28, a row of blisters is formed at the station 24. During the period that the web is still, that is while the clamps 20 and 28 are engaged, the web is heated and softened by the radiant heater 22. A heat reflector underlies and is spaced from the web 12 in the area of the heater 22. Clamps 20 may be plane surfaced but the clamps 26 and 28 must be profiled to accommodate the blisters formed at the station 24.

As will be more fully described hereinafter, all movements of the clamps 20, 26 and 28 and all movements within the forming station 24, are pneumatically actuated by conventional pistons and cylinders controlled by conventional solenoid actuated valves. The clamps 42 in Figure 1A are pneumatically operated so far as clamping action is concerned but are reciprocated parallel to the web by mechanical extensions of the feed clamps 26 in order to insure perfect synchronization of the two sets of feed clamps.

In Figure 1A the unit 32 for filling the blisters will be different for every product to be handled and the variety of products adaptable to this type of packaging is almost infinite. To name a few: flashlight bulbs, bobbins, sparkplugs and razor blades. Mechanisms for orienting, feeding and counting consecutive objects are conventional and are merely selected to meet the requirements of the particular item. Similarly, magazines and feeds for cards are conventional. It will be appreciated that in Figure 1A the clamps 38, 42 and 44 constitute a system precisely similar to that of clamps 20, 26 and 28 of Figure 1, the only difference being that in clamp 38 at least one of the jaws is heated to form a tack seal between the cards and the blisters. The scoring station 46 is both optional and conventional. Feed rolls 48 have only light frictional engagement with the web and the cards. The cutoff 50 is controlled by a conventional, settable counter to make cuts either at each row of blisters or after delivery of any desired number of mutually connected blisters.

The machine shown in Figures 1 and 1A is suitable for all operations in which the cards are substantially coextensive with the flanges of the blisters. When, however, it is desired to use cards which are much larger than the blisters, a different problem arises and is solved by the machine shown in Figure 2. The machine of Figure 2 is fed from the machine in Figure 1, to which is added a set of slitters 60 and a set of tension feed rolls 62. All the apparatus of Figure 1A is omitted. A loop of slack 64 is permitted to form between the machine of Figure 1 and that of Figure 2. From left to right in Figure 2 the machine comprises a holding clamp 66, a feed clamp 68, a cutoff 70, guide chutes 72, a blister inserter 74, a feed unit 76, a tack sealer 78, a card applier 80, a card magazine 82, a heat-seal station 84 and an ejection station 86. A pair of sprockets 88 carry a belt 90, which belt is given a step by step movement by any suitable mechanism such for example as a Geneva wheel. Tht belt 90 is made up of a plurality of sections designated generally as 100 in Figures 8 and 9.

Figure 8:
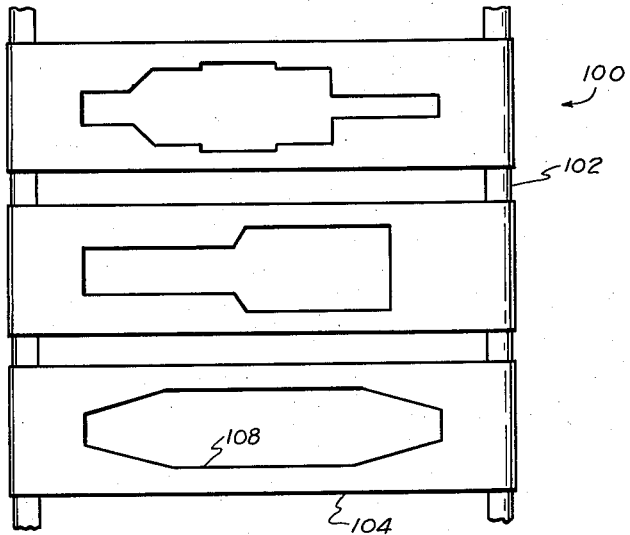
Figure 8 is a plan view of one of the blister receiving and supporting units.

Each section 100 is made up of end links 102 which extend between sprocket chains. One or more strips 104 of Teflon cloth are bent around the links 102 and have their margins drawn toward each other by a plurality of tension springs 106. Each strip 104 has an aperture 108 shaped to conform to one of the blisters, as shown in Figure 8. As this figure makes clear, the machine of Figure 2 may be used to fill and seal simultaneously a plurality of mutually different packages but it also may be used for the simultaneous filling and sealing of identical packages. The machine of Figure 2 also may be used independently to fill and seal previously formed and inventoried blisters.

The cycle of operations is as follows: due to the slitters 60, the blisters come to the machine of Figure 2 in the form of strips. With the clamp 66 open, the jaws 68 in retracted position close and advance the strips between the cutoff 70. Clamp 66 then closes, while the jaws 68 open and again retract. During this period, the cutoff 70 severs the strips into individual units and the severed units proceed down channels formed in the chute 72 into positions overlying openings 108 in a section 100 of the belt 90. At this point the blister inserter descends and firmly engages each blister within an aperture 108. Belt 90 then advances one more step to bring up a fresh section 100. The contents are inserted in the blisters at the feeding station 76 during a dwell in the advance of the belt 90. At the next station, suction cups 81 forming part of the card feeder 80, pick cards from the magazine 82 and place them over the flanges of the blisters. At this moment, the tack-seal jaws 78 close to secure the cards against shifting relative to the blisters. Final heat-sealing is done at the station 84, which for all practical purposes is identical with the sealing station 40 of Figure 1A. At station 86 simple knock-out rods eject the completed packages from the aperture 108.

The amplitude of feed of the jaws 68 is the same as that of the machine of Figure 1 but the amplitude of feed of the belt 90 is greater, since the dimensions of the card exceed those of the blister. The chute 72 may, if desired, have diverging channels for each line of blisters so that the cards may be made not only longer but wider than the blisters. Due to the slack 64, there need not be absolute synchronization between the machine of Figure 1 and that of Figure 2, the only essential being that the two machines perform the same number of cycles per minute.

The form of the blister, of course, is determined by the product to be packaged. Regardless of the form, however, the operations at the forming station will be the same. This applies to the mechanics of formation. Such essentially procedural matters as time and temperature, for example, will depend on the depth of draw, the kind and caliper of the plastic sheet being molded and the frequency of the cycle. In short, such procedural matters must be determined for each particular case. The present invention, however, offers unprecedented flexibility in adjusting these matters to various situations. The fundamentals of the forming operation will now be described, and discussion of the control means which afford the above mentioned flexibility will be deferred until the entire control system of the machine as a whole can be described.

Referring now to Figures 3, 3A, 3B and 4, the blister forming station comprises an upper movable platen 120, a lower movable platen 122 and an intermediate fixed platen 124. A sheet of plastic 12 which has been preheated at station 22 (Figure 1) is fed beneath the movable platen 120 and the fixed platen 124 and above the movable platen 122. As the sheet 12 comes to rest, the parts are in the position shown in Figure 3.

Male die members 126 are mounted on the underside of the platen 120. The upper portion of the fixed platen 124 is provided with a gasket 128, while the lower portion is provided with a groove 130. Vacuum ducts 132 are also formed in the fixed platen 124. The lower platen 122 carries a lower forming die 134. The die 134 has a bottom 136 and sidewalls 138. A longitudinal median baffle 140 extends the length of the die 134 and connects with endwalls 142. A series of transverse baffles 144 extend from the sidewalls 138 and intersect the longitudinal baffle 140, thus dividing the die 134 into a plurality of compartments, each registering with one of the male forming dies 126. The crests of the baffles 140 and 144 lie slightly below the crests of the walls 138 and 142. The crests of the sidewalls 138 and endwalls 142 lie in a common plane and are profiled to fit and register with the grooves 130 in the fixed platen 124. Apertures 146 are provided in the longitudinal baffle 140 to equalize pressure conditions throughout the several compartments.

As above noted, when the sheet 12 comes to rest, the parts are in the position shown in Figure 3. As a first step, the platen 122 moves upwardly, bringing the crests of the walls 138 and 142 into engagement with the sheet 12 and bringing the sheet into gasket-like sealing engagement with the grooves 130 in the fixed platen 124. The sheet is also brought into engagement with the bottoms of the male forming dies 126 to initiate forming operations.

The next step preferably is a lowering of the platen 120 which further deforms the sheet 12 until the platen 120 makes contact with the gaskets 128 on the fixed platen 124. At this point, the ducts are connected to a source of vacuum which draws the sheet 12 sharply into conformity with the male forming dies 126, the vacuum then is released, upper platen 120 moves upwardly and lower platen 122 moves downwardly in this sequence and the blisters thus formed in the sheet 12 are thus cleared to participate in the next advance of sheet 12.

Optionally, the male forming dies 126 may be controlled as to temperature. Equally obviously these dies may be made foraminous and subjected alternately to a forming vacuum or a stripping pressure. For a further option, the lower die 134 may be subjected to cooperative forming pressure or to a stripping vacuum or to both in sequence. The adoption of one or more such options would necessitate slight variations in the precise timing of the sequence above discussed. With the control system hereinafter disclosed, such adjustments may be made quickly and positively.

The basic principles involved in the heat-sealing steps of this invention are discussed in Patent No. 2,392,695, dated January 8, 1946. There are, however, some special considerations in the present invention for which reference is now made to Figures 6 and 7. Sealing the marginal flange of a filled blister pack is quite a different problem from simply sealing, for example the collapsed mouth of a bag, since any softening of the blister might result in deformation under the weight of the contents and for some types of contents over heating of the contents itself must be avoided. It will be recalled from the discussion of Figures 8 and 9 that the flanges of the blisters rest on a web or webs of Teflon impregnated glass cloth with the blister itself protruding downwardly through the web. A card overlies the flange and is brought to bear against a pressure backing member. If this were made the heated member, the heat would have to penetrate the paperboard card and this would require excessive time or temperature or both. Accordingly the heat is applied through the Teflon cloth web (104 in Figures 8 and 9) and the seal is effectuated. This means, however, that the heated member must surround the blister which immediately raises the above noted danger of over heating the blister or the contents or both. This problem has been met by resort to the structure shown in Figures 6 and 7.

Figure 6:
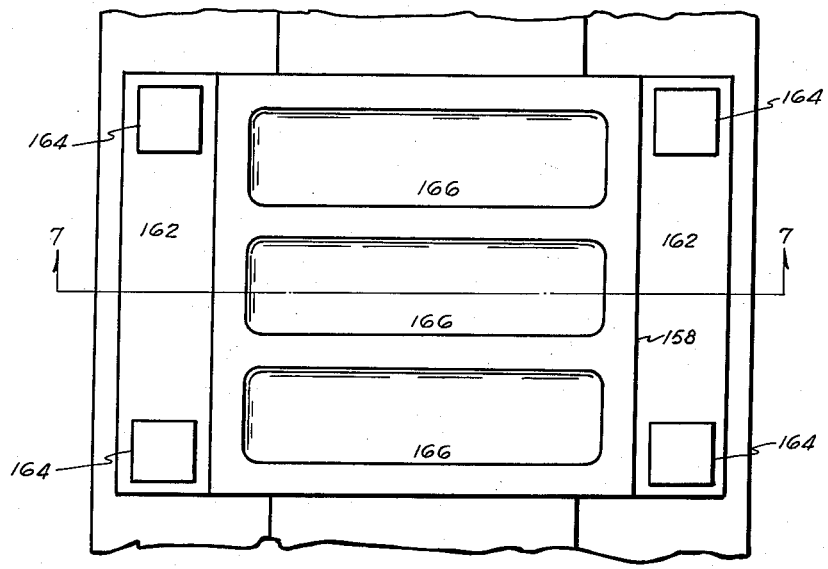
Figure 6 is a plan view of a heat-sealing die.
Figure 7:
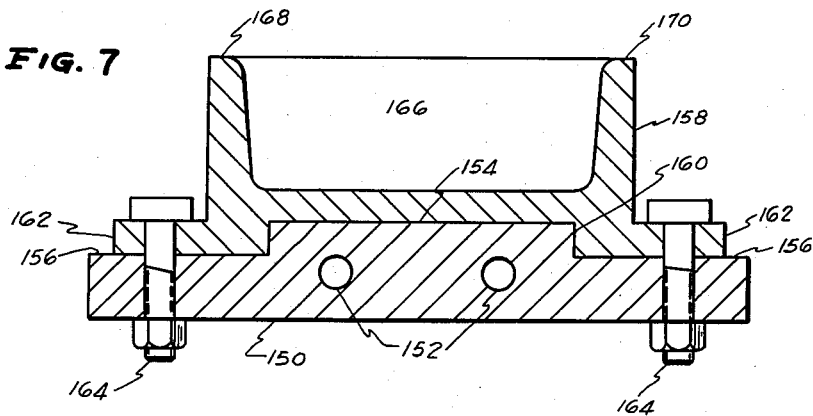
Figure 7 is a section on the line 7—7 of Figure 6.

Figures 6 and 7 show a vertically reciprocable platen 150 through which pass conventional heating elements 152. The upper surface of the platen 150 has a shoulder 154 and side flanges 156. One or more pressure elements 158 have in their lower surfaces grooves 160 which have a sliding fit to the shoulder 154 and the platen 150. The element 158 has side flanges 162 overlying the flanges 156 and are secured thereto by bolts 164. The upper portion of the pressure members 158 is divided into one or more cavities 166, defined by walls 168, the crests 170 of which lie in a common plane.

The material of which the platen 150 is made is not at all critical, provided it be metal and have sufficient strength. The pressure member 158, however, preferably is aluminum or equivalent, the essential requirement being that the metal have a high coefficient of conductivity and a low coefficient of emissivity.

The heating elements 152 are thermostatically controlled and maintain the platen at a settable, predetermined temperature. The pressure element 158 has firm contact with the platen 150 and due to its high conductivity, readily accepts heat from the platen. When the crests 170 are pressed against the webs 104 (Figures 8 and 9) heat flows rapidly through the web 104 and into the flange of the blister. Within the cavities 166, however, heat is produced only by radiation. The time required for adequate heating of the blister flange by conduction is far less than that required to overheat the blister within the cavity by radiation.

In keeping with the principles of flexibility and versatility on which the present invention is largely based, the pressure members 158 may be applied to or removed from the platen 150 either by vertical lifting or horizontal sliding. A variety of members 158 may be provided to accommodate a similar variety of blisters.

Reference is now made to Figures 5 and 5A which disclose an optional method of closing and sealing the blisters and which is usable in place of the cards heretofore discussed. Sometimes it will be desirable, particularly where hermetic sealing is required, to cap the blisters with an impervious plastic film. Frequently it is difficult to initiate a tear in such a film for the purpose of opening the package. For this reason it is desirable to provide a tear strip to facilitate opening of the package. This is accomplished by the means schematically illustrated in Figure 5.

A roll 200 of top closure material supplies a web 202 to a guide roll 204, which deposits the web 202 upon the sheet 12 to overlie blisters 206. A punch and die 207 is arranged and timed to perforate the web 202 at suitable intervals. A similar punch and die 207' is similarly timed to perforate the sheet 12 in the areas representing the flange material between consecutive blisters.

A roll 208 of tear strip material supplies a strip 210 to a pair of heated rolls 212. These press the strip 210 against the web 202 and seal the strip to the web in alignment with the perforations produced by the punch and die 207. It will be noted that the strip 210 underlies the web 202 when the latter is pressed against the flanges of the blister 206. The combination as it appears at lower right of Figure 5 then proceeds through the sealing, slitting and cutting stations previously discussed. A plan view of the final product occurs in Figure 5.

Where the blister portion is designated 214 the flange 216 and notches 218 occur at each end of the package. These notches result from registration of the perforations formed by the punch and die 207 in the web 202 with those formed by the punch and die 207' in the sheet 12. The tear strip 210 extends the full length of the package and the notches 218 give ready access to the ends of the strip for convenient opening.

When the device of Figure 5 is used the heating of the final sealing element is reversed: that is the top die is heated, and shielded by Teflon while the lower die is cold and top-surfaced with silicone rubber.

The heretofore unsolved problem of the packaging industry has been how to combine high production rates with flexibility and versatility. By versatility is meant the ability to work on a variety of products and materials. By flexibility is meant quick, accurate changeovers with a minimum of shut down time due to the making of such changeovers. Frequency, the number of cycles per unit of time, is determined largely by the size of the package and the kind and caliper of the plastic sheet. The adjustment of frequency is the simplest adjustment ever required. Any change in frequency, however, will necessitate other changes within the cycle. For example, for any given kind and caliper of plastic sheet, there is an optimum molding temperature for any particular form to be drawn.

Radiant heating is by far the most practicable method of bringing the plastic web to formable temperature. Radiant heating, however, involves far greater problems of control than does the conventional use of heating bars or rods. In radiant heating there is no thermal inertia, hence the heating is subject to immediate disturbance by changes in the circumambient atmosphere. To meet this problem, in most cases, control is by means of a plurality of thermocouples, wired in parallel to produce an "average" signal. The average signal is amplified and used to control one or more reactors which adjust the voltage applied to a plurality of radiant heating elements. The control is sufficiently sensitive to hold the working temperature within a margin of less than two degrees F. almost without regard to drafts and other atmospheric changes. In some cases where the packaging frequency is low (five to ten operations per minute) an additional factor must be considered. The temperature which the web must attain is fixed by the character and caliper of the web. The radiant heaters necessarily operate above this temperature. If the exposure of the web is too prolonged, the web may attain an undesirably high temperature. To meet this problem, a timer may be inserted in the heating circuit so that the heating may be interrupted (or continued) only for so long as to result in presenting the web to the forming dies at the optimum temperature. At the forming station, start, dwell and return to the platens, and start and dwell of the vacuum all must be adjustable within any given cycle for optimum results. With these factors in mind, the control system will now be discussed.

Figure 11:
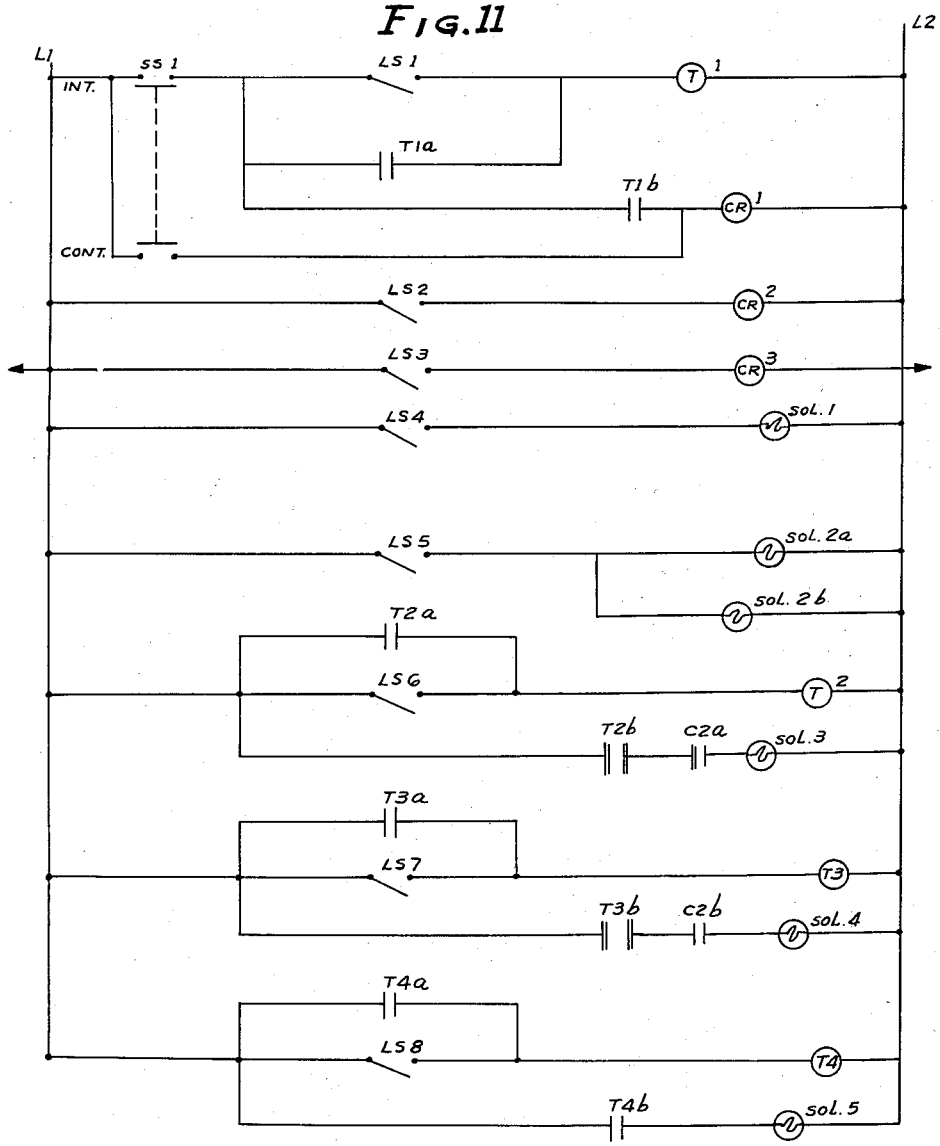
Figure 11 is a simplified wiring diagram for timing and controlling the operation of the stations of Figures 1 and 1A.
Figure 12:
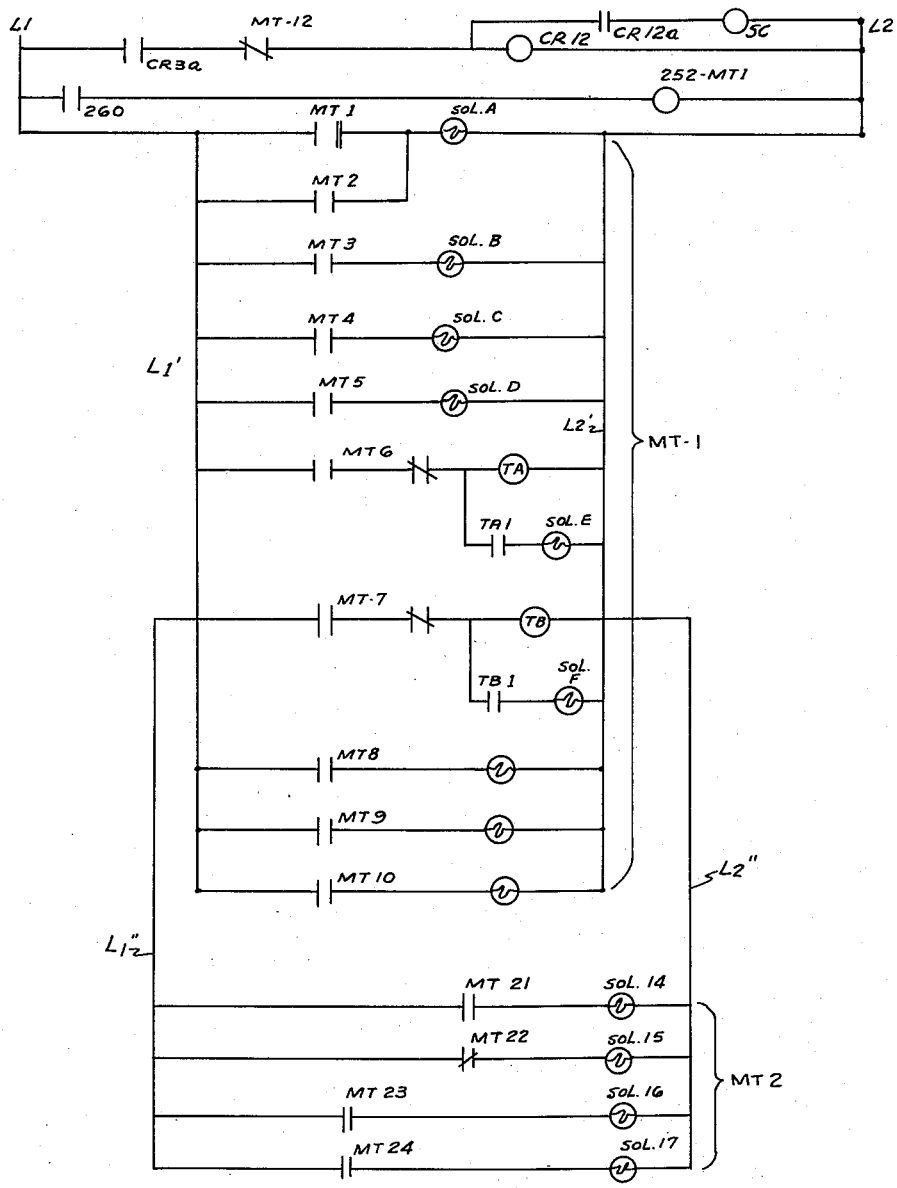
Figure 12 is a simplified wiring diagram for control and timing of the stations shown in Figure 2 and their synchronization with the stations of Figure 1.

In the showing of Figures 11 and 12 every effort has been made to eliminate purely conventional features which automatically would be supplied by any competent designer. For this reason motor starters, emergency and reset stop buttons, individual manually operated start and cut out buttons for particular operations have been omitted except where essential to understanding. Most of these latter are used only in start-ups and particularly in rethreading the machine after a stoppage or shut-down.

Figure 10:
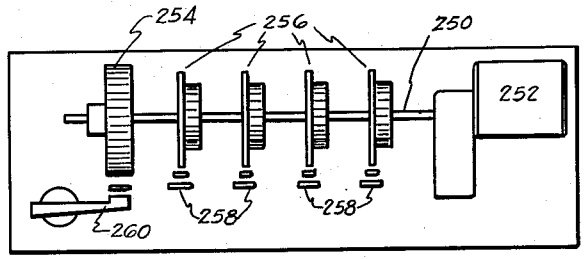
Figure 10 is a schematic elevation of a typical timer unit.

Reference is now made to Figure 10 in which a typical one revolution timer is illustrated. As will appear hereinafter, most of the "limit switches" are operated by timers of this type, of which several are used. These timers are not to be confused with settable timers, several of which also are used. Briefly, the one revolution timer is made up of shaft 250 driven by a motor 252 through a one revolution clutch 254. A plurality of circumferentially adjustable cams are mounted on the shaft 250 and each is provided with a set of contacts 258, each of which may be wired as either a normally open or normally closed contact. The one revolution clutch 254 is triggered by a solenoid operated mechanism 260. This triggering may be done by a cam operated switch or by one of the cams 256 on a similar timer. For reasons of simplicity, only four cams 256 and associated contacts are shown, but this number may be substantially multiplied.

The speed (r.p.m.) of the motor 252, as a practical matter, is a constant. The duration of a cycle (one revolution of the shaft 250) is adjustable by changing the gearing between the motor 252 and the shaft 250. Within this duration, however, the adjustability of the cams 256 permits adjustment of the period of activity (or inactivity) of the contacts 258.

While Figures 11 and 12 are based on electrical actuation of the various piston and cylinder combinations, or rather to energizing solenoids to operate valves for this purpose, any or all of these operations may be made wholly fluid pressure operated, even to the timing operations. In such case a cam would open a pilot valve which in turn would operate a three or four way valve to control the piston and cylinder. A timer valve, which may be adjustable, could be placed in the line of either the pilot valve or the three or four way valve. In general, electric timing is less expensive, for the same degree of accuracy and adjustability than is fluid pressure timing. In this particular case electric timing is preferred, especially as a concomitant of the use of pneumatic pressure. If, however, hydraulic pressure were used, the above suggested arrangement should be given serious consideration. The principles of operation are precisely the same in either case. It is, of course, also possible to use a combination of electrical and fluid pressure actuation. For hydraulic elements capable of use in the above suggested arrangements, reference is hereby made to "Hydraulics as applied to the Machine Tool Industry" edition of 1952, published by Vickers Incorporated. The essential point is to provide adjustability without dependence on gears and sprockets.

Figure 11 is particularly pertinent to Figures 1 and 1A, while Figure 12 is particularly pertinent to Figure 2. Referring to Figure 11, it may be assumed that lines L1 and L2 have been appropriately energized. It may be assumed further that all of the various manually operable switches have been closed to permit automatic operation of the several stations and that the main drive motor and the vacuum pump are in operation. If starting switch SS1 is brought into its uppermost position for intermittent operation, closure of LS1 by means of a circumferentially adjustable cam energizes a settable timer T1 which closes its normally open contacts T1a to lock the circuit established by the closure of LS1 and also closes the normally open contact T1b of the timer to energize a control relay CR1. CR1 closes the circuit to the heater 22 of Figure 1. T1 then times out and deenergizes CR1 breaking the circuit through the heater 22. The setting just described is useful when the blister to be formed is large and the frequency is low. The heater 22 operates continuously with excellent effect where the cycle occurs from 20 to 30 times per minute. At lower frequencies, however, there is danger of overheating during a prolonged dwell, hence under such conditions the heating time is limited by the settable timer T1.

Under most conditions starting switch SS1 will be in its lowermost position for continuous operation and the circuit will run from L1 to L2 through CR1, which will hold closed the circuit of heater 22.

Assuming continuous automatic operation, the camshaft driven from the main motor closes a limit switch LS2 to energize a control relay CR2, a solenoid of which triggers the activity of the mechanism of Figure 2 as will be described hereinafter in connection with Figure 12. The camshaft then closes a limit switch LS3 to energize a control relay CR3. Limit switch LS4 then closes and through CR3 energizes solenoid SOL1. Solenoid 1 operates valves to close the feed clamps 20 and 28 of Figure 1. Limit switch LS5 is normally closed holding energized solenoids 2a and 2b. These solenoids operate to hold the clamp 20 closed while a line of blisters is being formed.

The cams then close limit switch LS6 to energize a settable timer T2. Energizing the timer T2 closes its normally open contacts T2a and T2b, the former locks the circuit established by LS6, the latter, through the closed (but normally open) contacts C2a of the relay CR2 energizes a solenoid SOL3. Solenoid SOL3 operates a valve to bring the forming die 134 (Figure 3) into engagement with gasket 128 of the fixed platen 124 in the position shown in Figure 3A.

The camshaft then closes limit switch LS7 which energizes a settable timer T3. Energizing the timer T3 closes its normally open contacts T3a and T3b. The former locks the circuit established by LS7. The latter, through the closed (but normally open) contacts C2b of the relay CR2, energizes a solenoid SOL4. Solenoid SOL4 operates a valve to lower the platen 120 from its position shown in Figure 3A to the position shown in Figure 3B.

Figure 3B:
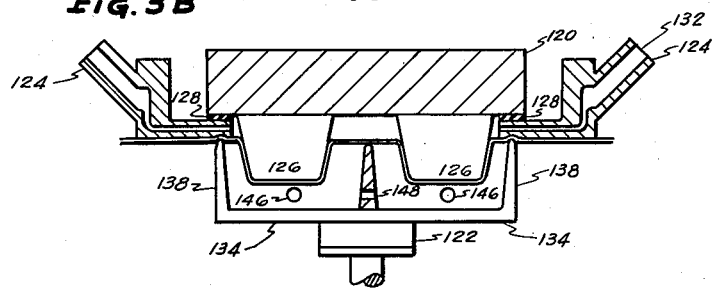
Figure 3B is similar to Figure 3 and illustrates the final forming step.
Figure 4:
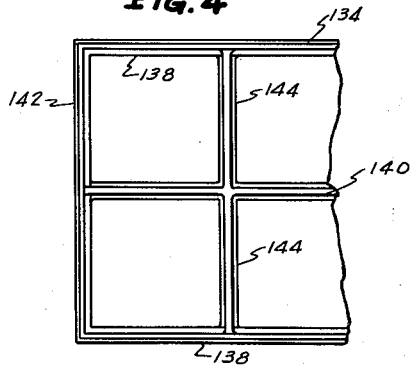
Figure 4 is a plan view of the lower forming member.

With the parts in the position shown in Figure 3B, the camshaft closes normally open limit switch LS8 to energize a settable timer T4. Energizing timer T4 closes normally open contacts T4a and T4b. The former locks the circuit established by LS8. The latter energizes a solenoid SOL5. SOL5 operates a valve to connect the ducts 132 of the fixed platen 124 (Figures 3–3B) to a source of vacuum, thereby drawing the web 12 into conformity with the dies 126 on the upper platen 120.

Now as to the circuits represented by limit switches LS6, LS7 and LS8, when the respective timers T2, T3 and T4 time out, the respective contacts T2a–T2b; T3a–T3b; and T4a–T4b will open to destroy the circuits respectively initiated by limit switches LS6, LS7 and LS8 thereby reversing the several valves under control of the respective solenoids SOL3; SOL4; and SOL5. The sequence of initiation, determined by the setting of cams on the camshaft, is preferably LS6, LS7 and then LS8 and timing out, preferably, is in reverse sequence T4; T3; and then T2. However, it is not inconceivable that for some combination of package contour and material a different sequence would be advantageous and certainly the mechanics of cam setting and timer setting makes possible any combination of sequence and duration that may be desired.

The normally closed limit switch LS5 is a special case. While LS5 is closed, the web 12 is held by clamps 20 and 28 against feeding movement. In Figure 1A, this applies also to clamps 44. Limit switch LS5 is opened by the camshaft when a feeding movement is about to begin and is held open for the duration of the feeding movement. At the end of the feeding movement, LS5 closes, the web is clamped and remains so during the action of LS6, LS7 and LS8, both initiation and timing out. Simultaneously with the opening of LS5, solenoid SOL6 is energized to bring a feeding movement of jaws 26 and 42 (Figure 1A).

Referring now to Figure 12, it will be noted that there are, in effect, three control sections operating respectively between lines L1 and L2; and L1' and L2'; and L1" and L2". The controls and contacts occurring between lines L1' and L2' represent a timer of the sort illustrated in Figure 10, while the controls and contacts between the lines L1" and L2" represent a similar timer. The controls between L1' and L2' all occur within a master timer designated as MT1 while those occurring between L1" and L2" are part of a master timer designated as MT2.

The operation of the circuits shown in Figure 12, which control the operation of the apparatus shown in Figure 2, is triggered off by the relay CR3 shown in Figure 11. Energizing CR3 closes its normally open contacts CR3a through normally closed contacts MT12 of the master timer MT1, thence through and energizing a control relay CR12. Energizing CR12 closes its normally open contacts CR12a which energize a starting coil SC which in turn starts a motor 252–MT1 by closing normally open contacts 260 of timer MT1. The relationship between motor 252 and contacts 260 appears in Figure 10.

Incidental to the energizing of relay CR12 is a start-up of the geneva drive on sprockets 88 to advance the belts 90 one step (Figure 2). A limit switch (not shown) deenergizes CR12 at the end of each feeding step of the belts 90.

In connection with timers of the type shown in Figure 10 each contact 258 may be operated optionally either as normally open or normally closed and by proper adjustment of the cams 256, can be brought from open to closed position or vice versa at any point in the cycle and maintained in such condition for any portion of the cycle. In the course of one revolution of the shaft, the following operations take place:

The contacts MT1 close, energizing solenoid SOL–A. This (see Figure 2) advances card pickers 81 against the lead cards in the magazine 82.

Contacts MT3 then close, energizing solenoid SOL–B, which opens a vacuum valve, thus securing the cards to the pickers 81.

Contacts MT1 then open to deenergize solenoid SOL–A which permits the pickers 81 to retract, drawing cards with them.

Contacts MT4 then close to energize solenoid SOL–C. This causes the card picker arms to rotate to their lower position placing a card over each blister.

Contacts MT2 (which are in parallel with contact MT1) close to reenergize SOL–A, thereby causing the pickers 81 to lower the cards onto the blisters.

Contacts MT5 close to energize solenoid SOL–D lowering an anvil 78' into contact with the card.

At this point, contacts MT3 open deenergizing solenoid SOL–B to close the vacuum valve and release the cards from the pickers 81.

Contacts MT6 close, energizing a settable timer TA.

Timer TA starts timing and through its contacts TA1, energizes a solenoid SOL–E which causes the heated tacker 78 to move upward to clamp the cards and blisters between itself and the anvil 78' to effect a spot seal between each of the cards and blisters.

While the spot seal is going on, contacts MT2 open, deenergizing solenoid SOL–A and permitting retraction of the pickers 81.

Contacts MT4 open, deenergizing solenoid SOL–C and permitting the pickers to rotate to their starting position.

At about this point, timer TA times out, opening contacts TA1 to deenergize solenoid SOL–E, which drops the tacker 78 to its lower position.

At the same time, contacts MT5 open, deenergizing solenoid SOL–D permitting the anvil 78 to return to up position.

At about the time of closing contacts MT6, contacts MT7 also close, energize a timer TB which starts timing, thereby closing its normally open contacts TB1 to energize a solenoid SOL–F. SOL–F causes the sealing jaws at heat-seal station 84 to close, beginning the final and complete sealing operation.

When timer TB times out, contacts TB1 open, deenergizing SOL–F and terminating the sealing operation.

As many additional contacts MT8, MT9, MT10, etc. with associated solenoids, may be provided to control the operation of the product loader or feeder 76 and the completed product ejector or disposal system 86. These mechanisms will vary greatly with the nature of the product, hence are without general application.

Figure 9:
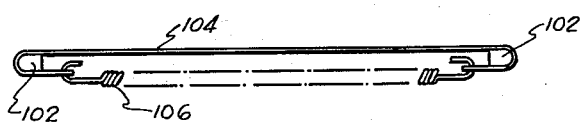
Figure 9 is an elevation corresponding to Figure 8.

Referring now to Figure 2, the holding clamp 66, the feed clamp 68 and blister inserter 76 all are under control of a master timer MT2. The starting point of a cycle of MT2 has the holding clamp 66 disengaged, the feed clamps 68 engaged in retracted position, the cut-off 70 open and the blister inserter 74 disengaged. Because the inserter 74 can operate only while the belts 90 are stationary, it is preferable to initiate the cycle of timer MT2 only after completion of a feed step of the belts 90. Since the cycle of timer MT2 does not include any heat-sealing steps, the overall duration of the MT2 cycle will be perceptibly shorter than that of the MT1 cycle. This difference in cycle duration is taken advantage of to assure time enough for the individual blisters, severed by the cut-off 70, to slide down the distribution channels 72 into the path of the inserters 74. The motor of the timer MT2 is started by the same limit switch not shown, which deenergizes the relay CR12. Once the timer MT2 is started, contacts MT21 close and energize a solenoid SOL–14. This advances the feed bars 68, thereby drawing forward a row of blister strips. Normally closed contacts MT22 then open, deenergizing a solenoid SOL–15, releasing the feed bars 68 from engagement with the blister strips and engaging holding clamp 66. At this point, the feed clamp 68, though not in engagement with the strips, remains in advanced position. Contacts MT23 and MT24 then close. These respectively energize solenoids SOL–16 and SOL–17 which respectively close the cutter 70 and lower the inserter 74 to press a row of blisters into apertures 108 (Figures 8 and 9). At this point contacts MT1 open, deenergizing solenoid SOL–14 and retracting feed bar 68 one index. Thereupon contacts MT22 close, energizing solenoid SOL–15 to reengage feed clamps 68 with the blister strip and to disengage holding clamp 66. Contacts MT23 and MT24 then open, deenergizing solenoids SOL–16 and SOL–17 which respectively open the cut-off 70 and withdraw the inserters 74.

From the foregoing it will be clear that the major objective of this invention has been met, namely by the provision of cycles within cycles and with extreme adjustability and adaptability within each cycle. A most flexible machine is provided and at the same time great capacity is obtained. Moreover, using the same valves and solenoids, instantaneous adjustments may be made merely by providing timers of the type of Figure 10 in parallel circuits and switching from one to the other when a different size or style of package is required. It is to be understood that, as used herein the term "camshaft" is to include a "series switch."

I claim:

1. A packaging machine having, in combination, means for advancing a web of plastic; means for forming at least one series of consecutive blisters in said web; means for depositing at least one object in each of said blisters; means for applying a covering sheet over each blister with the deposited object therein, and means for sealing the covering sheet to the blister, fluid pressure means for operating the forming means; a camshaft for initiating the operation of said fluid pressure means; and a manually adjustable timing device intermediate said camshaft and said fluid pressure means for terminating the operation of said means.

2. In a packaging machine of the blister type: means for advancing a plurality of strips of plastic, each strip having formed therein a series of blisters; means for simultaneously severing a plurality of blisters, one from each of the several strips; means for increasing the lateral spacing between blisters; means for inserting each blister in an individual pocket in a belt; means for advancing said belt in timed relation with the blister severing means; means for depositing a covering sheet on each blister; means for simultaneously forming a partial seal between each blister and its covering sheet; and means operative thereafter for completing the seal between each blister and its sheet.

3. A machine as set forth in claim 2 including a camshaft for initiating in predetermined sequence the operation of the several means.

4. A machine as set forth in claim 3 including adjustable timers for terminating at least some of the operations initiated by said camshaft.

5. In a machine for forming, filling and sealing packages: a first unit having means to advance a continuous web of plastic; means for forming in said web consecutive rows of blisters, and means to slit the web into parallel strips each containing at least one series of consecutive blisters; a second unit receiving the strips of blisters produced by the first unit, said second unit having means to advance the strips received from the first unit, means to sever the several strips into consecutive blisters, means to separate the blisters of the several strips laterally, means to thrust the several strips into a carrier, means to advance the carrier in timed relationship to the severance of the strips, means to deposit at least one object into each blister, means to apply to each blister a cover having greater lateral dimensions than the blister, and means to seal the cover to the blister; and means actuated by one of said units for insuring that the other of said units operates the same number of cycles per unit of time as the first unit, each unit having means for controlling and adjusting all operations of the cycle performed by such unit.

6. In a packaging machine: means for advancing a series of blisters; means for advancing a web of cover material; means for forming a line of perforations in said cover material; means to apply a tear strip to said cover material with the tear strip passing over the perforations; means to superimpose said cover material on said blisters with the tear strip between said cover material and said blister, and means to seal the cover material to the blisters.

7. A packaging machine as set forth in claim 6 including means to secure the tear strip to the web of cover material prior to superimposing said cover material on said blisters.

8. A method of packaging comprising: advancing a continuous web of plastic material; forming in said web consecutive rows of blisters; slitting said web into strips of consecutive blisters; severing said strips into rows of individual blisters; separating the blisters of each row, guiding the individual blisters thus severed into pockets in a conveyor, and while the blisters are in said pockets placing at least one object in each blister, applying a cover to each blister and sealing each cover to its associated blister.

9. A method as set forth in claim 8 in which the operations of forming and slitting are carried out on a different center to center pattern of the blisters than in the operations of severing, separating, filling and covering.

10. A method as set forth in claim 8 including the steps of independently controlling the operations of forming and slitting; independently controlling the operations of severing, filling, covering and sealing; and synchronizing the first and second named operations.

11. A method as set forth in claim 10 in which the operations of forming and slitting are carried out on a different center to center pattern of the blisters than in the operations of severing, separating, filling and covering.

12. A packaging machine made up of two units operating at the same frequency but on different centers, a camshaft for each unit to initiate in predetermined sequence the operations of such unit, the camshaft of one of said units having means to initiate the operation of the camshaft of the other unit.

13. A packaging machine as set forth in claim 12 including means on each of said camshafts to terminate as well as initiate the several operations under its control.

14. A packaging machine as set forth in claim 12 including adjustable timers to terminate at least some of the operations initiated by each of said camshafts.

15. A packaging machine having means for forming blisters in a web, means for filling the blisters thus formed, means to apply covers to said blisters and means for sealing the covers to the blisters, a camshaft to initiate in predetermined sequence the operation of the several means, and manually adjustable timers intermediate the cam shaft and said means to terminate the operation of at least some of the several means.

16. A packaging machine having means to receive at least one strip of consecutive blisters, means to separate the blisters, means to guide the separated blisters into pockets on a conveyor, means to fill the blisters, means to apply covers to the blisters and means to seal the blisters to the covers, a camshaft to initiate the operation of the several means in predetermined sequence, and manually adjustable timers intermediate the camshaft and said means for terminating the operation of at least some of the several means.

17. A method of packaging comprising: advancing a continuous web of plastic material; forming in said web consecutive rows of blisters; slitting said web longitudinally of the web into strips of consecutive blisters; severing said strips laterally into rows of individual blisters; guiding the individual blisters of adjacent strips into mutually diverging paths, while advancing the same in the original direction of advance to provide lateral separation of said blisters, placing at least one object in each blister; applying to each blister a cover which exceeds in its dimensions the dimensions of the blister and sealing each cover to its associated blister, and advancing said blisters between each of the steps aforesaid.

18. A method of packaging comprising: advancing a continuous web of plastic material; forming in said web consecutive rows of blisters; slitting and severing said web into rows of individual blisters; guiding the blisters of each row into mutually diverging paths, while advancing the same in the original direction of advance to provide lateral separation of said blisters; placing at least one object in each blister; applying to each blister a cover which exceeds in its dimensions the dimensions of the blister, sealing each cover to its associated blister, and advancing said blisters between each of the steps aforesaid.

References Cited in the file of this patent

UNITED STATES PATENTS

| | | |
|---|---|---|
| 2,048,396 | Lasker | July 21, 1936 |
| 2,215,036 | Hartman | Sept. 17, 1940 |
| 2,321,057 | Weiss | June 8, 1943 |
| 2,333,059 | Tucker | Oct. 26, 1943 |
| 2,556,008 | Spalding | June 5, 1951 |
| 2,645,070 | Nicolle | July 14, 1953 |
| 2,649,392 | Marshall | Aug. 18, 1953 |
| 2,655,777 | Hagen | Oct. 20, 1953 |
| 2,668,705 | Rosenthal | Feb. 9, 1954 |
| 2,712,717 | Keller | July 12, 1955 |
| 2,736,150 | Loew | Feb. 28, 1956 |
| 2,753,671 | DePuy et al. | July 10, 1956 |
| 2,765,606 | Brown | Oct. 9, 1956 |
| 2,833,683 | Quandt | May 6, 1958 |
| 2,896,387 | Brock | July 28, 1959 |